US 12,088,135 B2

(12) United States Patent
Kitanosako

(10) Patent No.: US 12,088,135 B2
(45) Date of Patent: Sep. 10, 2024

(54) ELECTRONIC DEVICE AND CONTROL METHOD

(71) Applicant: CANON KABUSHIKI KAISHA, Tokyo (JP)

(72) Inventor: Hiroki Kitanosako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 649 days.

(21) Appl. No.: 17/376,269

(22) Filed: Jul. 15, 2021

(65) Prior Publication Data

US 2022/0037905 A1    Feb. 3, 2022

(30) Foreign Application Priority Data

Jul. 29, 2020    (JP) ................................. 2020-128504

(51) Int. Cl.
*H02J 7/00*    (2006.01)
*G06F 1/26*    (2006.01)

(52) U.S. Cl.
CPC ............ *H02J 7/0068* (2013.01); *G06F 1/263* (2013.01); *G06F 1/266* (2013.01); *H02J 7/00041* (2020.01)

(58) Field of Classification Search
CPC .................. H02J 7/0068; H02J 7/00041; H02J 7/007182; G06F 1/263; G06F 1/266
See application file for complete search history.

(56) References Cited

U.S. PATENT DOCUMENTS

| | | | | |
|---|---|---|---|---|
| 6,337,557 B1* | 1/2002 | Kates | ................... | H02J 7/0045 320/132 |
| 6,404,163 B1* | 6/2002 | Kapsokavathis | ... | H02J 7/00302 320/104 |
| 8,310,209 B2* | 11/2012 | Bonkhoff | .................. | H02J 7/00 320/141 |
| 8,416,596 B2* | 4/2013 | Huang | .............. | H02M 3/33507 363/21.18 |

(Continued)

FOREIGN PATENT DOCUMENTS

JP    2006-280028 A    10/2006

OTHER PUBLICATIONS

D. K. W. Cheng and F. H. Leung, "Design of a switching mode power supply with UPS features," 1995 IEEE TENCON. IEEE Region 10 International Conference on Microelectronics and VLSI. 'Asia-Pacific Microelectronics 2000'. Proceedings, Hong Kong, China, 1995, pp. 444-447, (Year: 1995).*

*Primary Examiner* — Stacy Whitmore
(74) *Attorney, Agent, or Firm* — Cowan, Liebowitz & Latman, P.C.

(57) ABSTRACT

An electronic device includes a first control unit, a voltage conversion unit, a power supply unit, and a second control unit. The voltage conversion unit converts the voltage supplied from a power supply device into an output voltage, depending on a voltage of a battery. The power supply unit uses power supplied from the power supply device to charge the battery and supply power to the first control unit. The second control unit controls the power supply unit, to supply power to the first control unit via the voltage conversion unit, in a case where a duty of PWM control exceeds a predetermined threshold, and to supply power to the first control unit without passing through the voltage conversion unit, in a case where the duty of PWM control is less than the predetermined threshold.

10 Claims, 9 Drawing Sheets

(56) References Cited

U.S. PATENT DOCUMENTS

| | | | |
|---|---|---|---|
| 2005/0189916 A1* | 9/2005 | Bucur | H02J 7/0068 |
| | | | 320/128 |
| 2009/0009142 A1* | 1/2009 | Nishikawa | H02J 7/00308 |
| | | | 320/148 |
| 2013/0132758 A1* | 5/2013 | Shiba | G06F 1/28 |
| | | | 713/340 |
| 2017/0063120 A1* | 3/2017 | Imazu | H02J 7/007182 |
| 2019/0097276 A1* | 3/2019 | Tanaka | H01M 10/44 |
| 2019/0204890 A1 | 7/2019 | Kitanosako | |
| 2019/0204895 A1 | 7/2019 | Kitanosako | |
| 2019/0204896 A1 | 7/2019 | Kitanosako | |
| 2020/0004307 A1 | 1/2020 | Kitanosako | |
| 2021/0034126 A1 | 2/2021 | Tsujimoto et al. | |
| 2021/0034139 A1 | 2/2021 | Tsujimoto et al. | |
| 2021/0152023 A1* | 5/2021 | Pearson | H02J 50/20 |
| 2022/0115866 A1* | 4/2022 | Fujisaki | H02J 7/00034 |

\* cited by examiner

F I G. 1
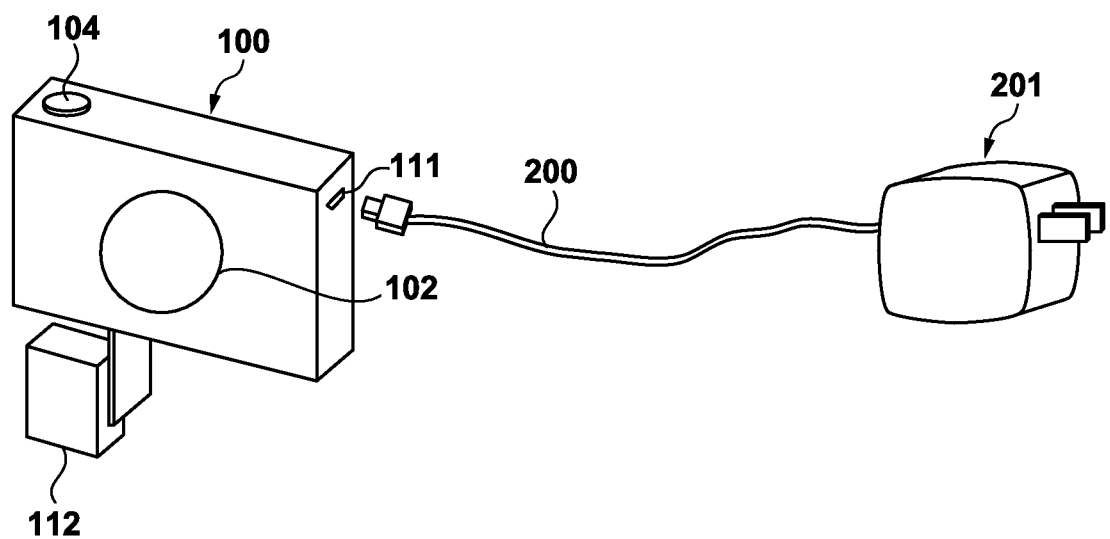

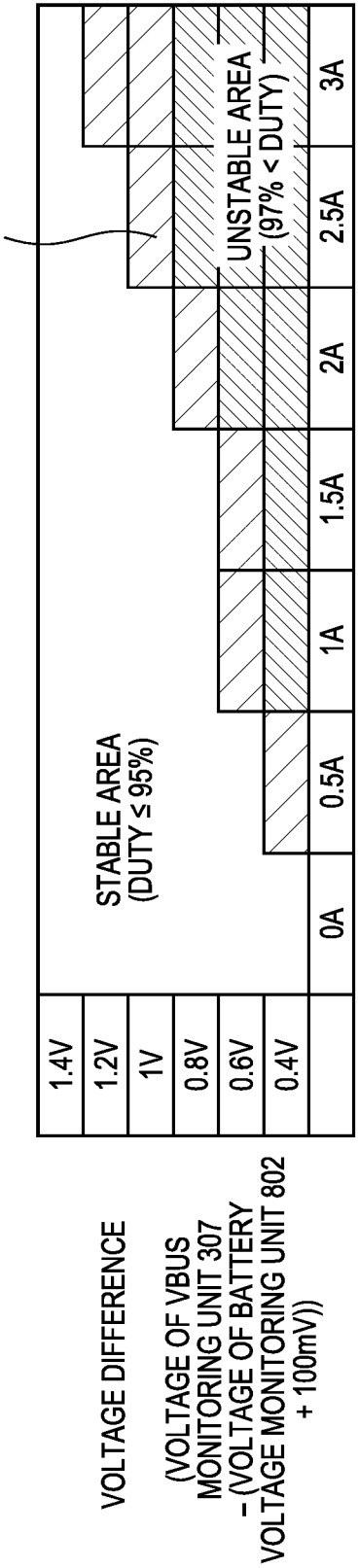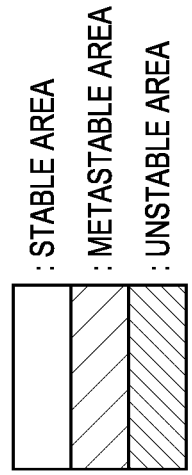

1

ELECTRONIC DEVICE AND CONTROL METHOD

BACKGROUND

Field of the Disclosure

Aspects of the disclosure generally relate to an electronic device which is operable by power supplied from a power supply device, and a method of controlling an electronic device.

Description of the Related Art

Japanese Patent Laid Open No. 2006-280028 describes a method in which between a battery and a power supply circuit, a path that does not pass through a DC-DC converter and a path that passes through the DC-DC converter are provided, and the power of the battery is supplied to the power supply circuit through any of these two paths.

In the method described in Japanese Patent Laid Open No. 2006-280028, even when a difference between an input voltage and an output voltage of a voltage conversion unit such as a DC-DC converter will be small, since the voltage conversion unit may be operated, it may not be possible to supply a stable output voltage.

SUMMARY

According to various embodiments, a device and a method capable of stably supplying an output voltage are provided.

According various embodiments, there is provided an electronic device including a first control unit; a voltage conversion unit that converts the voltage supplied from a power supply device into an output voltage, depending on a voltage of a battery; a power supply unit that uses power supplied from the power supply device to charge the battery and supply power to the first control unit; and a second control unit that (i) controls the power supply unit to supply power to the first control unit via the voltage conversion unit, in a case where a duty of PWM (pulse width modulation) control exceeds a predetermined threshold, and (ii) controls the power supply unit to supply power to the first control unit without passing through the voltage conversion unit, in a case where the duty of PWM control is less than the predetermined threshold.

According various embodiments, there is provided an electronic device including a first control unit; a voltage conversion unit that converts the voltage supplied from a power supply device into an output voltage, depending on a voltage of a battery; a power supply unit that uses power supplied from the power supply device to charge the battery and supply power to the first control unit; and a second control unit that (i) controls the power supply unit to supply power to the first control unit without passing through the voltage conversion unit, in a case where a difference between the voltage supplied from the power supply device and the voltage of the battery is smaller than a predetermined value, and (ii) controls the power supply unit to supply power to the first control unit via the voltage conversion unit, in a case where the difference between the voltage supplied from the power supply device and the voltage of the battery is greater than the predetermined value.

According various embodiments, there is provided a method including controlling a power supply unit of an electronic device to supply power to a control unit of an electronic device via a voltage conversion unit, in a case where a duty of PWM (pulse width modulation) control exceeds a predetermined threshold; and controlling the power supply unit to supply power to the control unit without passing through the voltage conversion unit, in a case where the duty of PWM control is less than the predetermined threshold, wherein the voltage conversion unit converts a voltage supplied from a power supply device into an output voltage, depending on a voltage of a battery, and wherein the power supply unit uses power supplied from the power supply device to charge the battery and supply power to the control unit.

According various embodiments, there is provided a method including controlling a power supply unit of an electronic device to supply power to a control unit of the electronic device without passing through a voltage conversion unit of the electronic device, in a case where a difference between a voltage supplied from a power supply device and a voltage of a battery is smaller than a predetermined value; and controlling the power supply unit to supply power to the control unit via the voltage conversion unit, in a case where the difference between the voltage supplied from the power supply device and the voltage of the battery is greater than the predetermined value, wherein the voltage conversion unit converts a voltage supplied from the power supply device into an output voltage, depending on a voltage of a battery, and wherein the power supply unit uses power supplied from the power supply device to charge the battery and supply power to the control unit.

Further aspects of the embodiments will become apparent from the following embodiments.

BRIEF DESCRIPTION OF THE DRAWINGS

FIG. 1 is a diagram illustrating an example of a connection between an electronic device 100 and a power supply device 201 according to first and second embodiments.

FIG. 9 is a diagram illustrating a stable region of the output voltage of the step-down type switching regulator according to the second embodiment.

DESCRIPTION OF THE EMBODIMENTS

Figure 2:
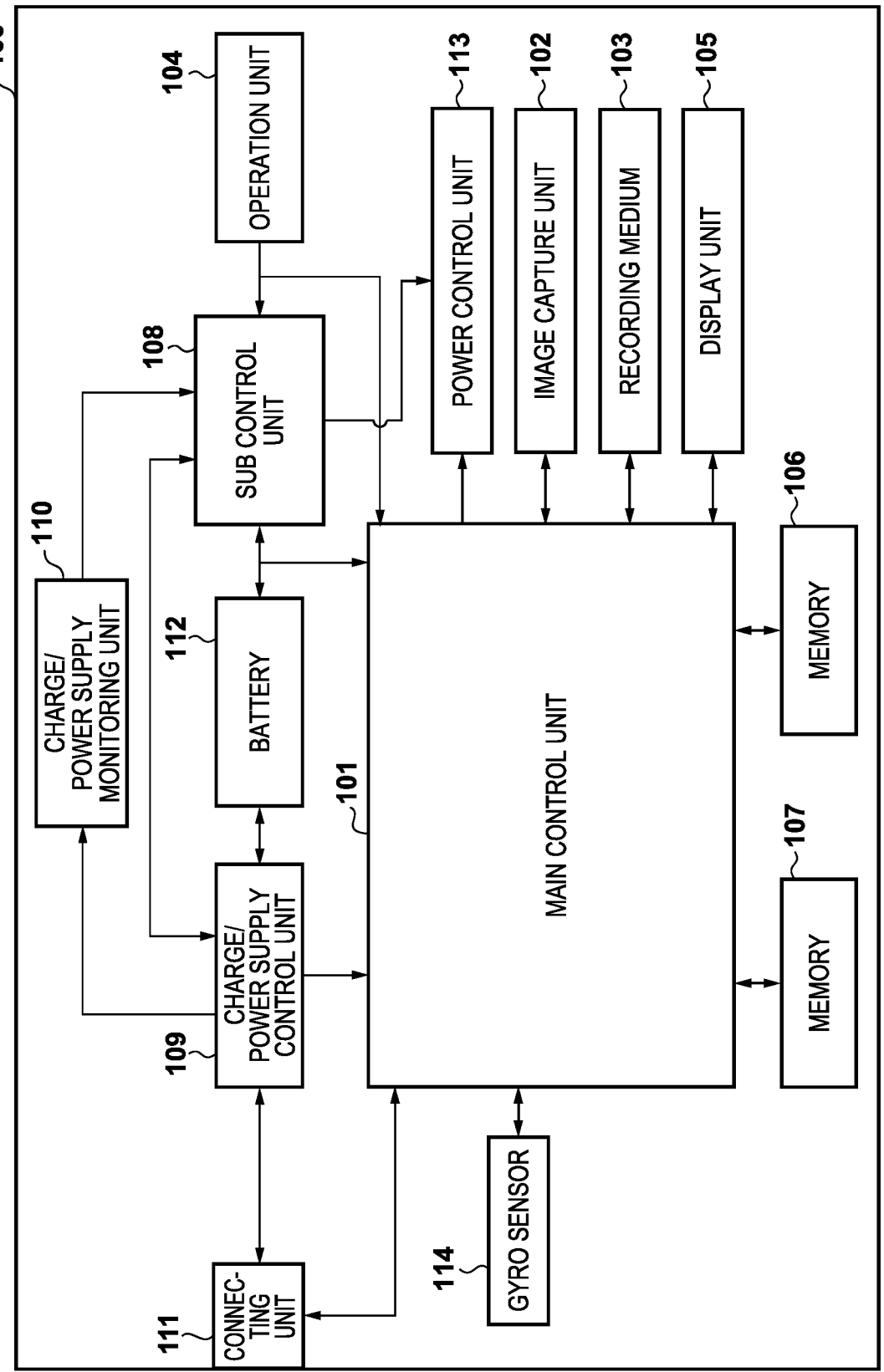
FIG. 2 is a diagram illustrating components of the electronic device 100 according to the first and second embodiments.

Exemplary embodiments, features, and aspects of the disclosure will be described below with reference to the drawings. However, aspects of the disclosure are not limited to the following embodiments.

[First Embodiment] FIG. 1 is the diagram illustrating the example of the connection between the electronic device 100 and the power supply device 201 according to the first and second embodiments. In the first embodiment, the case where the electronic device 100 is an electronic device can act as a digital camera will be described. However, the electronic device 100 is not limited to the electronic device that can act as the digital camera, and may be an electronic device that can act as a media player, a smartphone, or a personal computer.

The electronic device 100 comprises an image capture unit 102, an operation unit 104, and a connecting unit 111, which will be described later, the battery 112 can be inserted into and removed from the electronic device 100, and the electronic device 100 is operable with power of the battery 112.

The power supply device 201 is operable as an AC adapter or a mobile battery.

A connecting unit 111 is a connector which is compliant with a USB (Universal Serial Bus) Type-C standard and can be connected to the power supply device 201 via a USB Type-C cable 200. The power supply device 201 can supply power to the connecting unit 111 via the USB Type-C cable 200. The electronic device 100 can operate with power supplied from a battery 112 or a power supply device 201. The electronic device 100 can also charge the battery 112 with power supplied from the power supply device 201.

The power supply device 201 acts as a source device and the electronic device 100 acts as a sink device in view of a relationship between an input and an output of a VBUS terminal according to the first embodiment.

Next, with reference to FIG. 2, the components of the electronic device 100 will be described.

A main control unit 101 includes a hardware processor for controlling the components of the electronic device 100. The main control unit 101 can control the components of the electronic device 100 according to a program, which will be described later, stored in a memory 107.

An image capture unit 102 converts the object light formed by the lens included in the image capture unit 102 to electrical signal, performs a noise reduction process or the like, and outputs the digital data as image data. After the captured image data is stored in a buffer memory, a predetermined calculation is performed by the main control unit 101, and the image data is recorded in a recording medium 103.

The recording medium 103 can record image data output from the image capture unit 102. The recording medium 103 may be detachable from the electronic device 100 or may not be easily detachable from the electronic device 100. In any case, the electronic device 100 can access the recording medium 103 by some ways.

The operation unit 104 accepts a user instruction from a user, and notifies the main control unit 101 or the sub control unit 108 of signal corresponding to the user instruction. The operation unit 104 includes, for example, an operation member such as a power button for allowing the user to set the electronic device 100 to be a power ON state or a power OFF state, a shutter-release switch for a shooting instruction, and a zoom lever for a zooming instruction. A reproduction button for a reproduction instruction of the image data, a mode dial for instructing the activation mode of the electronic device 100, and a touch panel formed in the display unit 105 which will be described later, are also included in the operation unit 104. Note that the shutter-release switch outputs first switch signal SW1 or second switch signal SW2. When the shutter-release switch gets into a half-pressed state, the first switch signal SW1 is in the ON state. Thus, the main control unit 101 accepts an instructions for performing a shooting preparation such as an AF (automatic focus) process, an AE (automatic exposure) process, an AWB (automatic white balance) process and an EF (flash pre-emission) process. Furthermore, when the shutter-release switch gets into a fully pressed state, the second switch signal SW2 is in the ON state. Thus, the main control unit 101 accepts an instruction for performing shooting.

The display unit 105 performs display of a viewfinder image at the time of shooting, display of shot image data, display of character for interactive operation, or the like. The display unit 105 is not necessarily built in the electronic device 100.

A memory 106 is used as a buffer memory for temporarily holding image data captured by the image capture unit 102, an image display memory of the display unit 105, a work area of the main control unit 101, or the like.

A memory 107 is, for example, a nonvolatile memory, and stores a program, which will be described later, to be executed by the main control unit 101.

A sub control unit 108 includes a hardware processor for controlling some of the components of the electronic device 100. The sub control unit 108 can control some of the components of the electronic device 100 according to a program stored in a memory connected to the sub control unit 108. The sub control unit 108 is operable at a lower power consumption than the main control unit 101, acts as a power control circuit which can control a charge/power supply control unit 109 which will be described later, and can communicate with the main control unit 101.

The charge/power supply control unit 109 is a power supply control circuit that is capable of supplying power received from the power supply device 201 by the connecting unit 111 to the components of the electronic device 100, and at the same time, capable of charging the battery 112 with power received from the connecting unit 111.

The charge/power supply monitoring unit 110 is a monitoring circuit that monitors an operation state of the charge/power supply control unit 109 and notifies the sub control unit 108 of the acquired operation state.

The connecting unit 111 is an interface for connecting to the power supply device 201. The electronic device 100 can exchange data with the power supply device 201 via the connecting unit 111. The electronic device 100 can receive power supplied from the power supply device 201 via the connecting unit 111. In the first embodiment, the electronic device 100 act as a USB device, and the connecting unit 111 includes an interface connector for a USB communication with the power supply device 201, and a USB device controller. The main control unit 101 controls the connecting unit 111 to perform the communication by the USB and the charging by the USB with the power supply device 201.

A battery 112 supplies power to operate the electronic device 100. The battery 112 is configured to be removable from the electronic device 100 and to be capable of receiving and charging power from the connecting unit 111 via the charge/power supply control unit 109. The battery 112 has an authentication unit for executing a battery authentication process, the authentication unit of the battery 112 executes the battery authentication process between the battery 112 and the main control unit 101 or the sub control unit 108 of the electronic device 100.

A power control unit 113, in accordance with a state of the electronic device 100, performs control of supplying or blocking power from the battery 112 or the charge/power supply control unit 109 to each component of the electronic device 100. The power control unit 113 is controlled by the main control unit 101 or the sub control unit 108.

A gyro sensor 114 detects a rotation operation of the electronic device 100 due to a camera shake or the like at the time of shooting, and outputs digital data or analog data as the detection result to the main control unit 101. The main control unit 101, based on the data from the gyro sensor 114, performs the output of the lens drive signal for an optical correction and performs a correction of the image data acquired from the image capture unit 102. The gyro sensor 114 is susceptible to disturbance, and has characteristics of generating false signal by the variation of the power.

Figure 3:
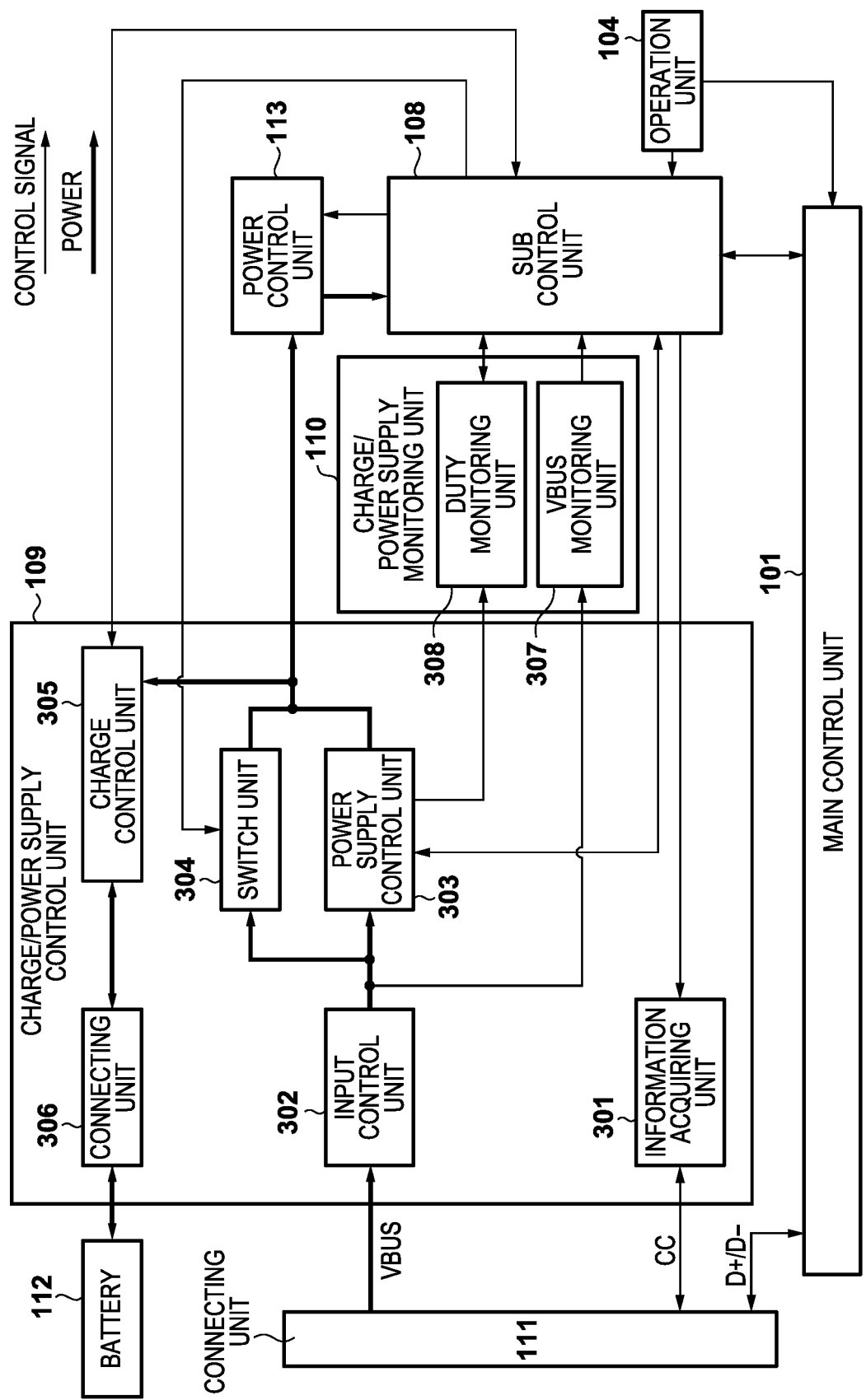
FIG. 3 is a block diagram illustrating components of a charge/power supply control unit 109 and a charge/power supply monitoring unit 110 according to the first embodiment.

Next, with reference to FIG. 3, the components of the charge/power supply control unit 109 and the charge/power supply monitoring unit 110.

An information acquiring unit 301 is connected to a CC terminal of the connecting unit 111, and acts as a PD communication control circuit that performs a communication which is compliant with a USB PD (Power Delivery) standard. The information acquiring unit 301 can perform the detection of the power supply capability of the connected power supply device 201 by using the terminal voltage of the CC terminal, and can perform negotiation of the power supply with the connected power supply device 201 by the communication using the CC terminal.

An input control unit 302 is connected to the VBUS terminal of the USB connector that is the connecting unit 111. The input control unit 302 can receive power from the power supply device 201 connected to the VBUS terminal, and switches the power supply destination to the power supply control unit 303 or the switch unit 304 based on the information from the information acquiring unit 301.

The power supply control unit 303 includes a step-down type switching regulator. The power supply control unit 303 performs the control of converting a VBUS voltage supplied via the input control unit 302 by performing a pulse width modulation (PWM) control of the step-down type switching regulator to a receptacle voltage by the power supply control unit 113 and a charge control unit 305 which will be described later. In the first embodiment, the power supply control unit 303 steps down the voltage received at 5V or 9V and lowers the voltage to an appropriate battery voltage. In the first embodiment, the battery 112 is a one-cell battery and is charged by a CC/CV charging so as to be fully charged at 4.2V, when the battery 112 is a two-cell battery, the battery 112 is charged by the CC/CV charging so as to be fully charged at 8.4V by stepping down 9V. When the battery 112 is not connected, the power supply control unit 303 performs a control process for converting the VBUS voltage supplied via the input control unit 302 to the most efficient voltage in the power control unit 113 (e.g., 3.7V).

Furthermore, based on the power supply capability of the power supply device 201 acquired by the information acquiring unit 301, the power supply control unit 303 can limit the current that can be supplied, in accordance with an instruction of the sub control unit 108. For example, when the power supply capability of the power supply device 201 is 9V/3 A, the power supply control unit 303 steps down to a predetermined voltage toward 4.2V that is a battery voltage, and performs a control process for preventing the current of 3.0 A or more from flowing. Furthermore, the power supply control unit 303, in accordance with an instruction of the sub control unit 108, stops the operation of the step-down type switching regulator, so as to stop the power supply to the power control unit 113 and a charge control unit 305 which will be described later. Note that depending on the configuration, when the step-down switching regulator of the power supply control unit 303 stops, the operation of the charge control unit 305, which will be described later, may also stop.

A switch unit 304 is a power path switch that controls the power supply path so as to supply the VBUS voltage supplied via the input control unit 302 to the power supply control unit 113 and the charge control unit 305 which will be described later without passing through the power supply control unit 303. The switch unit 304 is controlled to be the ON state or the OFF state by the sub control unit 108. The switch unit 304 is in a conductive state in the ON state, and in a non-conductive state in the OFF state. The switch unit 304 is controlled so as not to be the ON state at the time of operating the step-down type switching regulator of the power supply control unit 303.

The charge control unit 305 can charge the battery 112 which is connected to a connecting unit 306 which will be described later with the power received by the VBUS terminal via the power supply control unit 303 or the switch unit 304. The charge control unit 305 controls a constant current charging (CC charging) and a constant voltage charging (CV charging) by appropriately controlling the current flowing in the battery 112 or the voltage supplied to the battery 112.

The connecting unit 306 is a holder that is connectable to the battery 112. The connecting unit 306 is configured such that a power supply terminal for supplying power and a GND terminal are connected to a connection terminal between the authentication unit of the battery 112 and a thermistor terminal of the battery 112, respectively.

A VBUS monitoring unit 307 is a power supply voltage monitoring circuit that monitors the input the VBUS voltage and notifies the sub control unit 108 of the acquired voltage. For example, when the power supply capability of the power supply device 201 is 5V/3 A, the VBUS monitoring unit 307 monitors whether or not the power supply device 201 is outputting the voltage which is equal to or higher than the assumed voltage (15V., etc.). Alternately, due to a short or the like by the electronic device 100 being in an abnormal state, the VBUS monitoring unit 307 monitors whether or not the voltage of the electronic device 100 is significantly below the voltage of 5V. If necessary, the sub control unit 108 outputs the instruction for stopping the input control unit 302, and via the information acquiring unit 301, the instruction for stopping the power output to the power supply device 201.

A duty monitoring unit 308 is a circuit that monitors a duty ratio of the PWM control performed by the power supply control unit 303 and supplies data corresponding to the duty ratio to the sub control unit 108.

Figure 4:
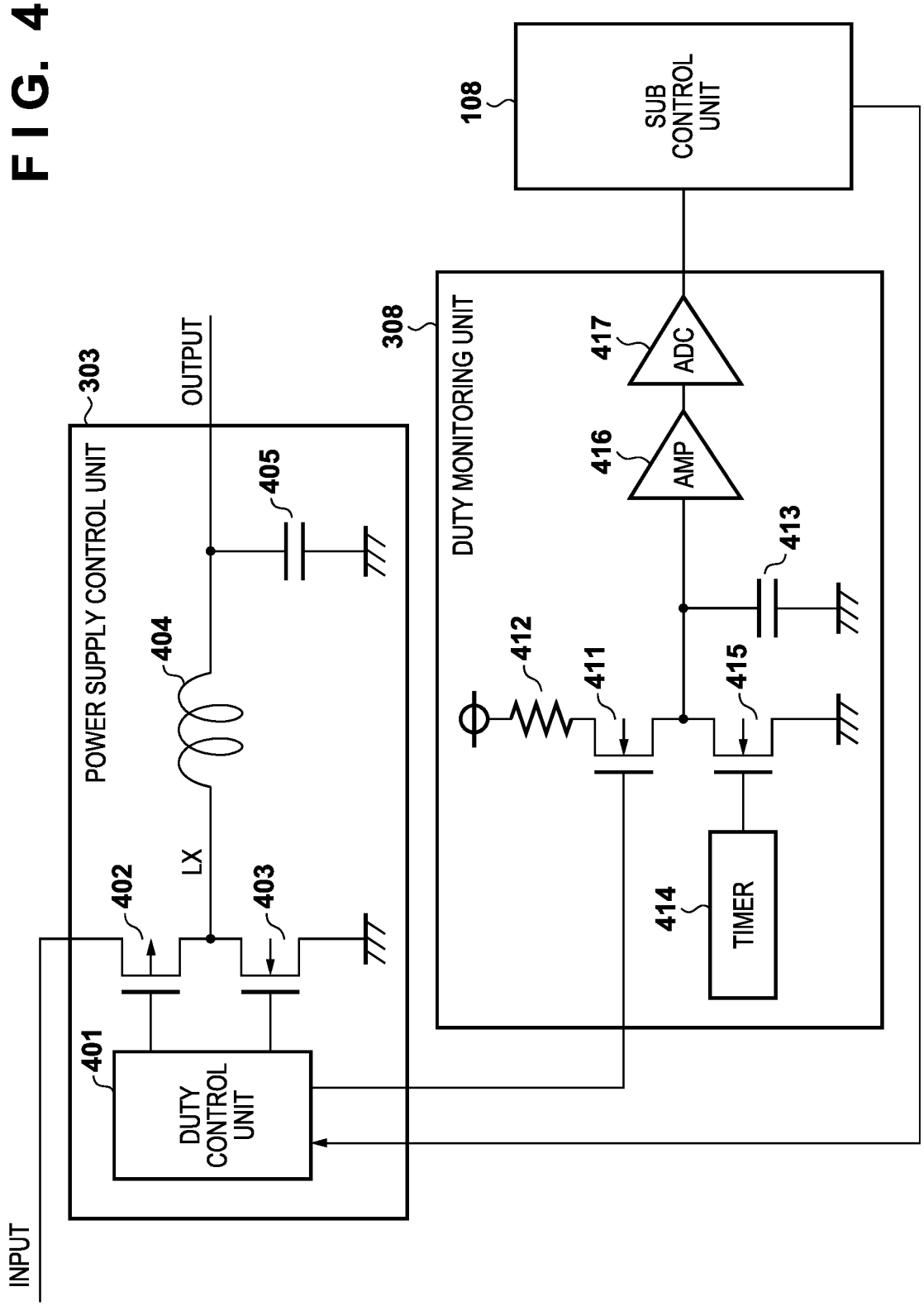
FIG. 4 is a diagram illustrating components of a step-down type switching regulator and a duty monitoring unit 308 of a power supply control unit 303.

Next, with reference to FIG. 4, the components of the step-down type switching regulator of the power supply control unit 303 will be described.

A duty control unit 401 performs the PWM control, the duty ratio is determined based on the feedback from the output voltage. The duty control unit 401 puts a high-side FET (Field Effect Transistor) 402 to be the ON state and puts a low-side FET 403 to be the OFF state during a High period of the duty. Furthermore, the duty control unit 401 puts the high-side FET 402 to be the OFF state and puts the low-side FET 403 to be the ON state during a Low period of the duty. When an abnormal state such as a high temperature state (70° C., etc.) or an overvoltage state (4.4V, etc.) of the battery 112 is detected, the duty control unit 401 puts the high-side FET 402 and the low-side FET 403 to be the OFF state and stops the voltage conversion control. Furthermore, it may be also performed to control stopping the voltage conversion control in accordance with an instruction from the sub control unit 108.

The high-side FET 402 is switched to the ON state or the OFF state by the control of the duty control unit 401. The high-side FET 402 is in a conductive state in the ON state, and a non-conductive state in the OFF state. The low-side FET 403 is switched to the ON state or the OFF state by the control of the duty control unit 401. The low-side FET 403 is in a conductive state in the ON state, and in a non-conductive state in the OFF state. During the High period of the duty, the input line and the LX line are in the conductive state, and the LX line is in a High level. During the Low period of the duty, the GND and LX lines are in the conductive state, and the LX line is in a Low level, and the pulse voltage corresponding to the duty ratio is generated in the LX line.

An inductor 404 and an output capacitor 405 constitute an LC filter, and smooth the pulse voltage of the LX line to the DC voltage and output it.

Next, with reference to FIG. 4, the components of the duty monitoring unit 308 of the charge/power supply monitoring unit 110 will be described.

A charge FET 411 is in the ON state by an instruction from the duty control unit 401 when the LX line is in the High level. On the other hand, the charge FET 411 is in the OFF state by an instruction from the duty control unit 401 when the LX line is in the Low level. When the signal voltage from the duty control unit 401 cannot put the charge FET 411 to be the ON state, a level shifter may be provided between the duty control unit 401 and the charge FET 411. Furthermore, the LX line may be directly connected to the gate terminal of the charge FET 411. The charge FET 411 is in the conductive state by the charge FET 411 being in the ON state, the charge capacitor 413 is charged from the power source being pulled up via a resistor 412. The voltage rises by the charge capacitor 413 being charged, a voltage rising rate of the charge capacitor 413 during the period of the ON state of the charge FET 411 is determined by the resistance of the resistor 412 and the capacitance of the charge capacitor 413. When the PWM frequency of the power supply control unit 303 is 1 MHz, for example, the resistor 412 is configured to be 1 kW and the charge capacitor 413 is configured to be 0.1 µF.

A timer 414 controls a discharge FET 415 to be the ON state or the OFF state at regular intervals. A discharge FET 415 is switched to the ON state or the OFF state by the control of the timer 414. The discharge FET 415 is in the conductive state in the ON state, and the non-conductive state in the OFF state. During the period of the ON state of the discharge FET 415, the voltage of the charge capacitor 413 is 0V because the electric charge accumulated in the charge capacitor 413 is discharged.

Figure 5:
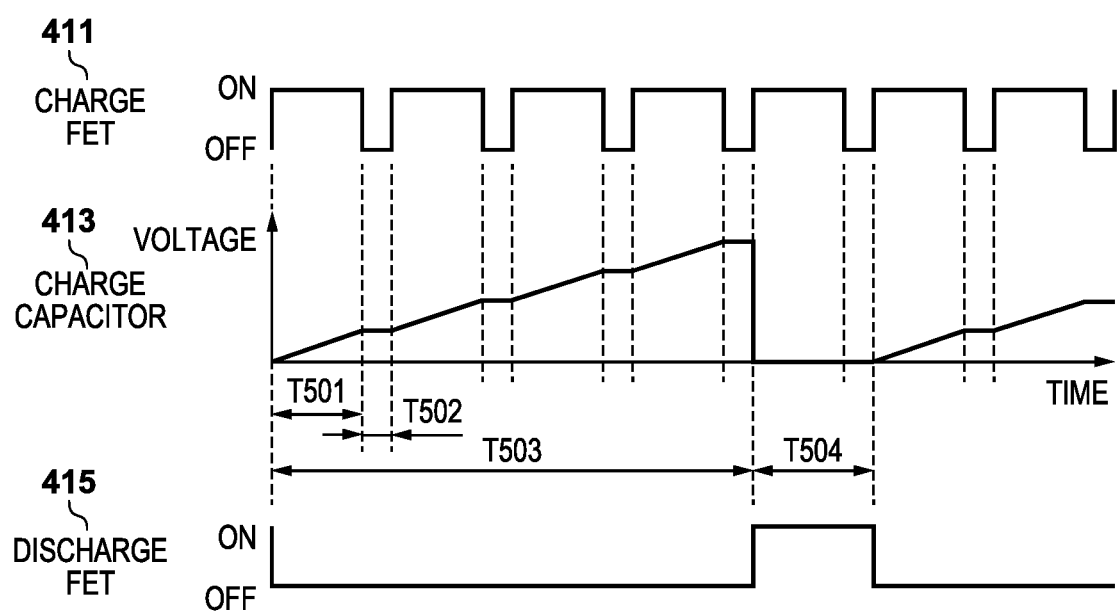
FIG. 5 is a timing chart illustrating a voltage change of a charge capacitor 413 when a power supply control unit 303 is performing a PWM control.

Next, with reference to FIG. 5, the voltage change of the charge capacitor 413 when the power supply control unit 303 is performing the PWM control.

The charge FET 411 is in the ON state or the OFF state in synchronization with the duty cycle determined by the duty control unit 401. A ratio between the ON period (T501) of the charge FET 411 and the OFF period (T502) of the charge FET 411 is the duty ratio. Since during T501 period, the charge capacitor 413 is charged from the power source being pulled up via the resistor 412, the voltage of the charge capacitor 413 rises. On the other hand, during T502 period, since the charge FET 411 is in the non-conductive state, the voltage of the charge capacitor 413 does not change. The voltage rising range of the charge capacitor 413 in one cycle is large when T501 period is long in one cycle. As described above, since the voltage rising range changes in accordance with the duty ratio, the duty ratio can be obtained from the voltage rising range within a certain period.

In the OFF period of the discharge FET 415 (T503), the voltage of the charge capacitor 413 rises in accordance with the duty ratio of the power supply control unit 303 as described above. However, in the ON period of the discharge FET 415 (T504), the voltage of the charge capacitor 413 is 0V regardless of whether the charge FET 411 is in the ON state or not.

An amplifier 416 amplifies the voltage of the charge capacitor 413 and outputs it to an A/D converter 417. The A/D converter 417 converts the signal from the amplifier 416 to digital data and outputs it to the sub control unit 108. The sub control unit 108, based on the voltage data acquired at regular intervals from the A/D converter 417, calculates the duty ratio of the power supply control unit 303.

In the first embodiment, the timer 414 and the A/D converter 417 are included in the components of the duty monitoring unit 308, but may be included in the sub control unit 108.

Next, with reference to the flowchart of FIG. 6, an example of a process executed when the sub control unit 108 of the electronic device 100 is connected by the USB to the power supply device 201 according to the first embodiment will be described.

In step S601, the sub control unit 108 detects that the power supply device 201 is connected to the connecting unit 111. The connection detection may be determined based on the VBUS voltage detected by the VBUS monitoring unit 307, or may be determined based on the voltage level of the CC terminal acquired by the information acquiring unit 301. The sub control unit 108 does not advance the process to the next step until the sub control unit 108 detects that the power supply device 201 is connected to the connecting unit 111, and advances the process to step S602 when the sub control unit 108 detects that the power supply device 201 is connected to the connecting unit 111.

In step S602, the sub control unit 108 starts the operation of the step-down type switching regulator of the power supply control unit 303 and puts the switch unit 304 to be the OFF state.

In step S603, the sub control unit 108 determines the power supply state to the main control unit 101 based on the power source state of the electronic device 100. The sub control unit 108 advances the process to step S604 when the power supply to the main control unit 101 is in the ON state, and advances the process to step S607 when the power supply to the main control unit 101 is in the OFF state.

In step S604, the sub control unit 108 detects the VBUS voltage supplied from the power supply device 201, and determines whether or not the VBUS voltage is a predetermined voltage (5V, etc.). The VBUS voltage detection may be performed by directly detecting the VBUS voltage by the VBUS monitoring unit 307, or the VBUS voltage may be determined using the information of the power supply device 201 detected by the information acquiring unit 301.

The sub control unit 108 advances the process to step S605 when the VBUS voltage is 5V, and advances the process to step S607 when the VBUS voltage is not 5V.

In step S605, the sub control unit 108 obtains the duty ratio of the PWM control of the power supply control unit 303 in the duty monitoring unit 308 and the sub control unit 108.

In step S606, the sub control unit 108 determines whether or not the duty ratio of the PWM control of the power supply control unit 303 is equal to or less than a predetermined threshold (e.g., 95% or less). The sub control unit 108 advances the process to step S607 when the sub control unit 108 determines that the duty ratio is equal to or less than a predetermined threshold, and advances the process to step S608 when the sub control unit 108 determines that the duty ratio exceeds the predetermined threshold.

If the power supply to the main control unit 101 in step S603 is in the OFF state, since the operation of the gyro sensor 114 or the like susceptible to the output variation of the power supply control unit 303 is also stopped, it is not necessary to concern the output variation of the power supply control unit 303. Therefore, the sub control unit 108 advances the process to step S607 without monitoring the duty ratio in step S605.

Furthermore, when the power supply device 201 is a device which is compliant with the USB PD standard, by a communication via the CC terminal between the information acquiring unit 301 and the power supply device 201, for example, negotiation at 9V that is greater than 5V is assumed to be completed. When the power supply control unit 303 converts the VBUS voltage 9V into a voltage suitable for charging a single cell battery fully charged 4.2V, the duty ratio of the PWM control of the power supply control unit 303 is sufficiently smaller than 100%. Therefore, in step S604, the sub control unit 108 advances the process to step S607 without monitoring the duty ratio in step S605 when the VBUS voltage exceeds a predetermined voltage (e.g., 5V).

In step S607, the sub control unit 108 repeats the process after step S603 until the sub control unit 108 detects that the power supply device 201 is detached from the connecting unit 111, and advances the process to step S612 when the sub control unit 108 detects that the power supply device 201 is detached from the connecting unit 111.

In step S612, the sub control unit 108 stops the operation of the step-down type switching regulator of the power supply control unit 303, puts the switch unit 304 to be the OFF state, and ends the process of step S612.

In step S606, when the duty ratio exceeds a predetermined threshold, it is concerned that the output voltage of the step-down type switching regulator of the power supply control unit 303 may be unstable. Therefore, in step S608, the sub control unit 108 stops the operation of the step-down type switching regulator of the power supply control unit 303, puts the switch unit 304 to be the ON state, and directly supplies the VBUS voltage from the power supply device 201 to the power control unit 113 and the charge control unit 305.

In step S609, the sub control unit 108 determines the power supply state for the main control unit 101 based on the power source state of the electronic device 100. The sub control unit 108 returns the process to step S602 when the power supply to the main control unit 101 is in the OFF state, starts the operation of the step-down type switching regulator of the power supply control unit 303, and puts the switch unit 304 to be the OFF state. Furthermore, the sub control unit 108 advances the process to step S610 when the power supply to the main control unit 101 is in the ON state.

In step S610, the sub control unit 108 determines whether or not the VBUS voltage is greater than 5V. The sub control unit 108 returns the process to step S602 when the VBUS voltage is greater than 5V, starts the operation of the step-down type switching regulator of the power supply control unit 303, and puts the switch unit 304 to be the OFF state. Furthermore, the sub control unit 108 advances the process to step S611 when the VBUS voltage is 5V.

In step S611, the sub control unit 108 repeats the process after step S609 until the sub control unit 108 detects that the power supply device 201 is detached from the connecting unit 111, and continues to directly supply the VBUS voltage from the power supply device 201 to the power control unit 113 and the charge control unit 305. In step S611, the sub control unit 108 advances the process to step S612 when the sub control unit 108 detects that the power supply device 201 is detached from the connecting unit 111, stops the operation of the step-down type switching regulator of the power supply control unit 303, puts the switch unit 304 to be the OFF state, and ends the process in step S611.

As described above, according to the first embodiment, it is determined based on the duty ratio of the PWM control of the power supply control unit 303 whether the output voltage of the power supply control unit 303 may be unstable. Then, the output voltage of the power supply control unit 303 directly supplies the VBUS voltage from the power supply device 201 to the power control unit 113 and the charge control unit 305 without passing through the switching regulator of the power supply control unit 303 in a state that the output voltage of the power supply control unit 303 may be unstable. Thus, it is possible to supply a stable voltage even when the difference between the input voltage and the output voltage of the switching regulator of the power supply control unit 303 will be small.

[Second Embodiment] In the first embodiment, it is determined from the duty ratio of the PWM control whether or not the output voltage of the power supply control unit 303 may be unstable. In contrast, in the second embodiment, it is determined based on the voltage difference and the load current which will be described later whether or not the output voltage of the power supply control unit 303 may be unstable.

In the second embodiment, components, functions, processes, or operations which are different from those of the first embodiment will be described. Among the components of the electronic device 100 in the second embodiment, the description of the components similar to those of the electronic device 100 in the first embodiment is omitted.

Figure 7:
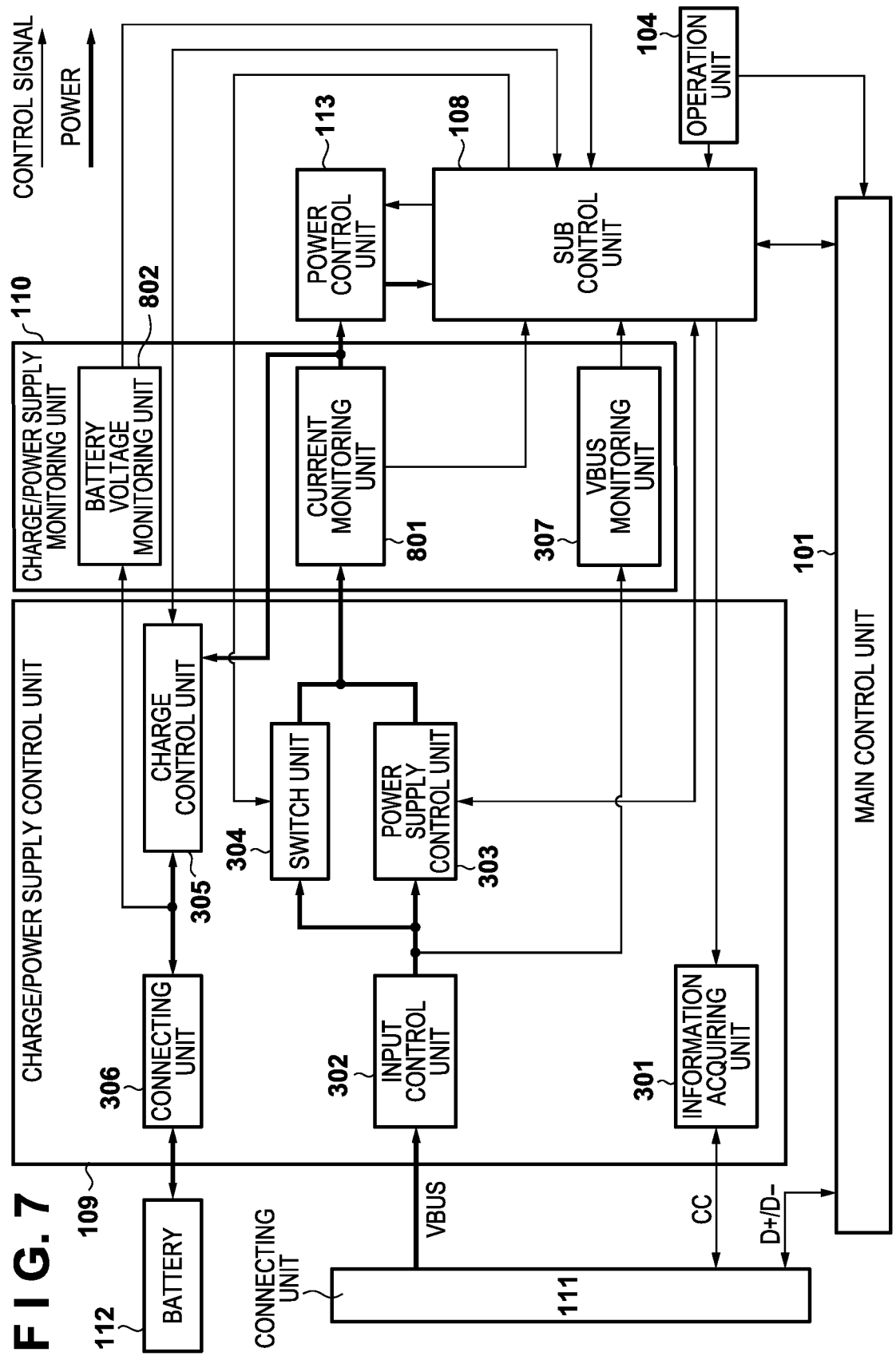
FIG. 7 is a block diagram illustrating components of the charge/power supply control unit 109 and the charge/power supply control unit 110 according to the second embodiment.

FIG. 7 is a block diagram illustrating the components of the charge/power supply control unit 109 and the charge/power supply monitoring unit 110 according to the second embodiment. In FIG. 7, the components denoted by the same reference numerals as those in FIG. 3 are the same as the components in FIG. 3 in the first embodiment, and therefore description thereof is omitted.

A current monitoring unit 801 is a monitoring circuit that monitors the output current of the power supply control unit 303 and the switch unit 304 and notifies the sub control unit 108 of the acquired current.

A battery voltage monitoring unit 802 is a monitoring circuit that monitors the voltage of the battery 112 which is connected via the connecting unit 306 and notifies the sub control unit 108 of the acquired voltage.

Figure 8:
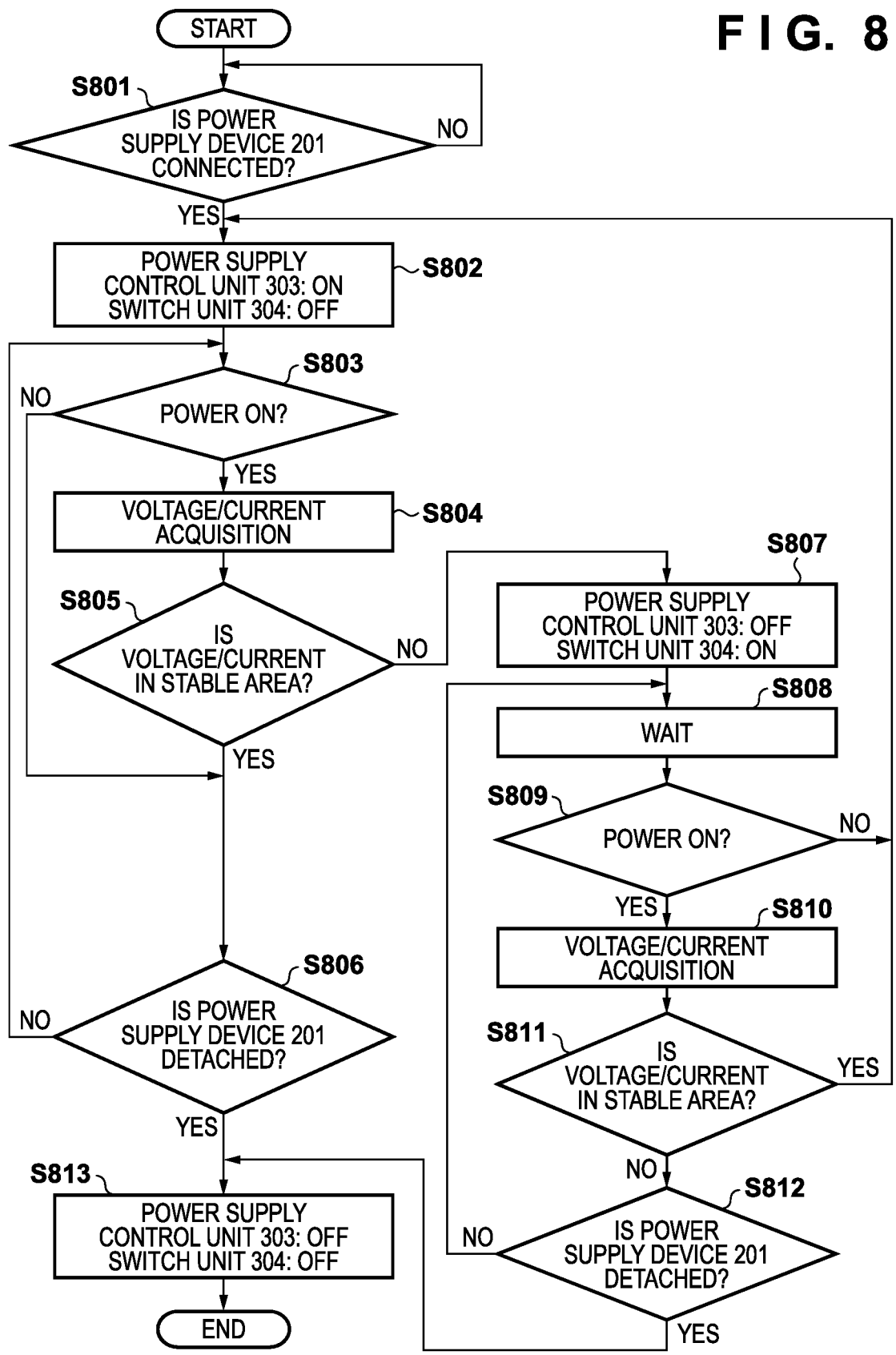
FIG. 8 is a flowchart illustrating an example of a process executed when the electronic device 100 is connected by the USB to the power supply device 201 via the sub control unit 108 according to the second embodiment.

Next, with reference to the flowchart of FIG. 8, an example of a process executed when the electronic device 100 is connected by the USB to the power supply device 201 via the sub control unit 108 according to the second embodiment will be described.

Figure 6:
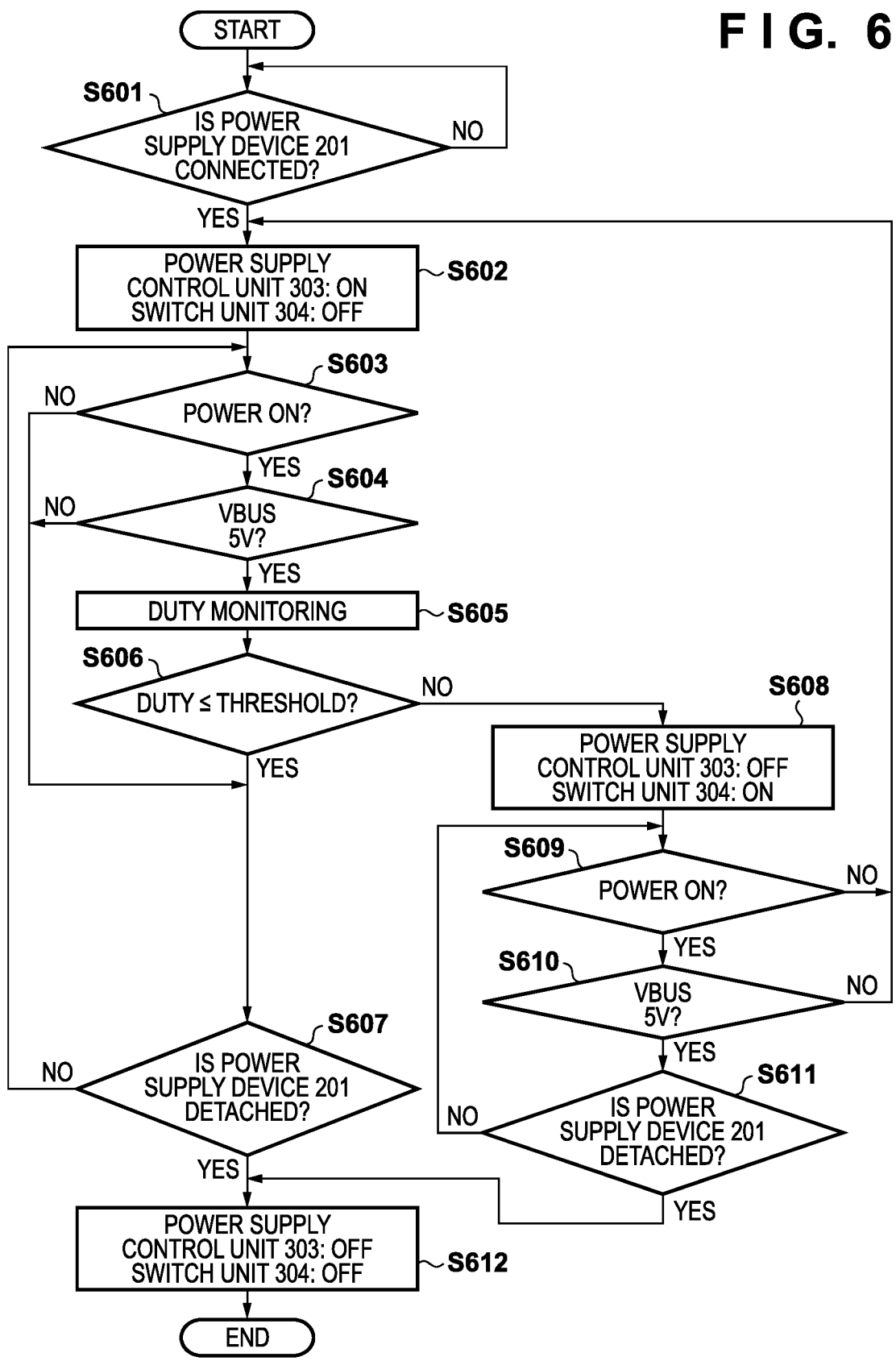
FIG. 6 is a flowchart illustrating an example of a process executed when the electronic device 100 is connected by a USB to a power supply device 201 via a sub control unit 108 according to the first embodiment.

The process executed in step S801 is the same process as the process executed in step S601 of FIG. 6. The process executed in step S802 is the same process as the process executed in step S602 of FIG. 6.

In step S803, the sub control unit 108 determines the power supply state for the main control unit 101 based on the power supply state of the electronic device 100. The sub control unit 108 advances the process to step S804 when the power supply to the main control unit 101 is in the ON state, and advances the process to step S806 when the power supply to the main control unit 101 is in the OFF state.

In step S804, the sub control unit 108 acquires the voltage detected by the VBUS monitoring unit 307 and the voltage detected by the battery voltage monitoring unit 802, and acquires the current detected by the current monitoring unit 801 as the load current.

The memory connected to the sub control unit 108 stores information indicating a stable area map of the power supply control unit 303 in advance. The stable area map of the power supply control unit 303 is illustrated in FIG. 9. The stable area map is indicated by a voltage difference {the voltage detected by the VBUS monitoring unit 307−(the voltage detected by the battery voltage monitoring unit 802+100 mV)} and a load current (the current detected by the current monitoring unit 801) when the power supply control unit 303 operates. In FIG. 9, the stable area is an area in which the voltage difference with respect to the load current is a predetermined value or more, the power supply control unit 303 can output the stable voltage. An unstable area is an area in which the voltage difference with respect to the load current is smaller than the predetermined value and the output voltage may be unstable by hunting the duty of the PWM control of the power supply control unit 303. A metastable area is an area between the stable area and the unstable area, and in which although the output voltage of the power supply control unit 303 is stable, the unstable area may be entered even when the voltage difference or the load current has a small change.

In step S805, the sub control unit 108 determines whether or not the power supply control unit 303 can output the stable voltage based on the stable area map stored in the sub control unit 108 and the voltage and the current acquired in step S804. Here, if the electronic device 100 stores the current consumption corresponding to the actual operation mode, instead of the current detected by the current monitoring unit 801, the current consumption corresponding to the actual operation mode may be used as the load current.

In step S805, the sub control unit 108 advances the process to step S806 when the sub control unit 108 determines that the stable area map is in the area in which the power supply control unit 303 can output the stable voltage, and advances the process to step S807 when the sub control unit 108 determines that the stable area map is not in the area in which the power supply control unit 303 can output the stable voltage.

When the power supply to the main control unit 101 in step S803 is in the OFF state, the operation such as the gyro sensor 114 susceptible to the output variation of the power supply control unit 303 is also stopped, and it is not necessary to concern the output variation of the power supply control unit 303. Therefore, the power supply control unit 303 advances the process to step S806 without determining whether or not the stable area map is in the area in which the power supply control unit 303 can output the stable voltage in step S805.

In step S806, the sub control unit 108 repeats the process after step S803 until the sub control unit 108 detects that the power supply device 201 is detached from the connecting unit 111, and advances the process to step S813 when the sub control unit 108 detects that the power supply device 201 is detached from the connecting unit 111.

In step S805, when the sub control unit 108 determines that the stable area map is not in the area in which the power supply control unit 303 can output the stable voltage, it is concerned that the output voltage of the step-down type switching regulator of the power supply control unit 303 may be unstable. Therefore, in step S807, the sub control unit 108 stops the operation of the step-down type switching regulator of the power supply control unit 303, puts the switch unit 304 to be the ON state, and directly supplies the VBUS voltage from the power supply device 201 to the power control unit 113 and the charge control unit 305.

In step S808, the sub control unit 108 sets a WAIT period so as not to repeat the ON state and the OFF state in a short period by the step-down type switching regulator of the power supply control unit 303 and the switch unit 304.

In step S809, the sub control unit 108 determines the power supply state for the main control unit 101 based on the power supply state of the electronic device 100. The sub control unit 108 advances the process to step S810 when the power supply to the main control unit 101 is in the ON state. Furthermore, the sub control unit 108 returns the process to step S802 when the power supply to the main control unit 101 is in the OFF state, starts the operation of the step-down type switching regulator of the power supply control unit 303, and puts the switch unit 304 to be the OFF state.

In step S810, the sub control unit 108, similarly to step S804, acquires the voltage detected by the VBUS monitoring unit 307, and the voltage detected by the battery voltage monitoring unit 802, the current detected by the current monitoring unit 801 as the load current.

In step S811, similarly to step S805, the sub control unit 108 determines whether or not the stable area map is in the area in which the power supply control unit 303 can output the stable voltage based on the stable area map stored in the sub control unit 108 and the voltage and the current acquired in step S804. Here, when the stable area is determined so as not to repeat the ON state and the OFF state in the short period, a hysteresis may be provided with the stable area map of FIG. 9.

In step S811, the sub control unit 108 returns the process to step S802 when the sub control unit 108 determines that the stable area map is in the area in which the power supply control unit 303 can output the stable voltage, starts the operation of the step-down type switching regulator of the power supply control unit 303, and puts the switch unit 304 to be the OFF state.

In step S812, the sub control unit 108 continues to directly supply the VBUS voltage from the power supply device 201 to the power control unit 113 and the charge control unit 305 until the sub control unit 108 detects that the power supply device 201 is detached from the connecting unit 111.

In step S812, the sub control unit 108 advances the process to step S813 when the sub control unit 108 detects that the power supply device 201 is detached from the connecting unit 111.

In step S813, the sub control unit 108 stops the operation of the step-down type switching regulator of the power supply control unit 303, puts the switch unit 304 to be the OFF state, and terminates the process in step S813.

As described above, according to the second embodiment, it is determined by the voltage difference and the load current whether the output voltage of the power supply control unit 303 may be unstable. Then, the sub control unit 108 directly supplies the VBUS voltage from the power supply device 201 to the power control unit 113 and the charge control unit 305 without passing through the switching regulator of the power supply control unit 303 in the state that the output voltage of the power supply control unit 303 may be unstable. Thus, it is possible to supply a stable voltage even when the difference between the input voltage and the output voltage of the switching regulator of the power supply control unit 303 will be small.

[Third Embodiment] Various kinds of functions, processes, or methods described in the foregoing embodiments can also be realized by a personal computer, a microcomputer, a CPU (Central Processing Unit), or the like with a program. In the third embodiment, a personal computer, a microcomputer, a CPU, or the like will be called a "computer X" below. Also, in the third embodiment, a program for controlling the computer X and realizing various kinds of functions, processes, or methods described in the foregoing embodiments will be called a "program Y".

Various kinds of functions, processes, or methods described in the foregoing embodiments are realized by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, a volatile memory (e.g., random access memory), a nonvolatile memory (e.g., read only memory), or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims the benefit of Japanese Patent Application No. 2020-128504, filed Jul. 29, 2020, which is hereby incorporated by reference herein in its entirety.

What is claimed is:

1. An electronic device comprising:
   a voltage conversion circuit that converts an output voltage from a power supply apparatus connected to the electronic device into an output voltage depending on a voltage of a battery by a PWM (pulse width modulation) control of a switching regulator;
   at least one processor which functions as:
   a first control unit;
   a charging unit that charges the battery;
   a power supply control unit that supplies power to the charging unit and the first control unit using power supplied from the power supply apparatus; and
   a second control unit that (i) controls the power supply control unit to supply the output voltage of the voltage conversion circuit to the first control unit and the charging unit, in a case where a duty cycle of the PWM control does not exceed a predetermined threshold, and (ii) controls the power supply control unit to supply the output voltage from the power supply apparatus to the first control unit and the charging unit without passing through the voltage conversion circuit, in a case where the duty cycle of the PWM control exceeds the predetermined threshold.

2. The electronic device according to claim 1, wherein the second control unit does not perform monitoring of the duty cycle of the PWM control, in a case where the electronic device is in a power OFF state.

3. The electronic device according to claim 1, wherein the second control unit controls the power supply control unit to supply the output voltage from the power supply apparatus to the first control unit and the charging unit irrespective of the duty cycle of the PWM control, in a case where the output voltage from the power supply device exceeds a predetermined voltage.

4. The electronic device according to claim 1, wherein the power supply control unit receives power from the power supply apparatus in conformity with USB Power Delivery standard, and
   wherein the output voltage from the power supply apparatus is 5V or 9V.

5. The electronic device according to claim 4, wherein the battery is fully charged at 4.2V, and
   wherein the voltage conversion circuit converts the output voltage of 5V from the power supply apparatus into 4.2V, in a case where the output voltage from the power supply apparatus is 5V.

6. The electronic device according to claim 4, further comprising:
   a connector in conformity with USB Type-C standard,
   wherein the power supply apparatus is connected to the connector via a USB Type-C cable.

7. The electronic device according to claim 1, wherein the second control unit controls the power supply control unit to supply the output voltage from the power supply apparatus to the charging unit irrespective of the duty cycle of the PWM control, in a case where the electronic device is in a power OFF state.

8. The electronic device according to claim 1, wherein the first control unit is a main control unit of the electronic device, and the second control unit is a sub control unit operable at a lower power consumption than the first control unit.

9. A control method of an electronic device having a charging unit that charges a battery of the electronic device and a voltage conversion circuit that converts an output voltage from a power supply apparatus into an output voltage depending on a voltage of a battery by a PWM (pulse width modulation) control of a switching regulator, comprising:
   controlling a power supply unit of an electronic device to supply the output voltage of the voltage conversion unit to a control unit of the electronic device and the charging unit, in a case where a duty cycle of the PWM control does not exceed a predetermined threshold; and
   controlling the power supply unit to supply the output voltage from the power supply apparatus to the control unit and the charging unit without passing through the voltage conversion circuit, in a case where the duty cycle of the PWM control exceeds the predetermined threshold.

10. A non-transitory storage medium that stores a program causing a computer to execute a control method of an electronic device having a charging unit that charges a battery of the electronic device and a voltage conversion circuit that converts an output voltage from a power supply apparatus into an output voltage depending on a voltage of a battery by a PWM (pulse width modulation) control of a switching regulator, the method comprising:
   controlling a power supply unit of an electronic device to supply the output voltage of the voltage conversion unit to a control unit of the electronic device and the charging unit, in a case where a duty cycle of the PWM control does not exceed a predetermined threshold; and
   controlling the power supply unit to supply the output voltage from the power supply apparatus to the control unit and the charging unit without passing through the voltage conversion circuit, in a case where the duty cycle of the PWM control exceeds the predetermined threshold.

* * * * *